Oct. 24, 1961 K. C. MARD ET AL 3,005,520
VIBRATION ABSORBER

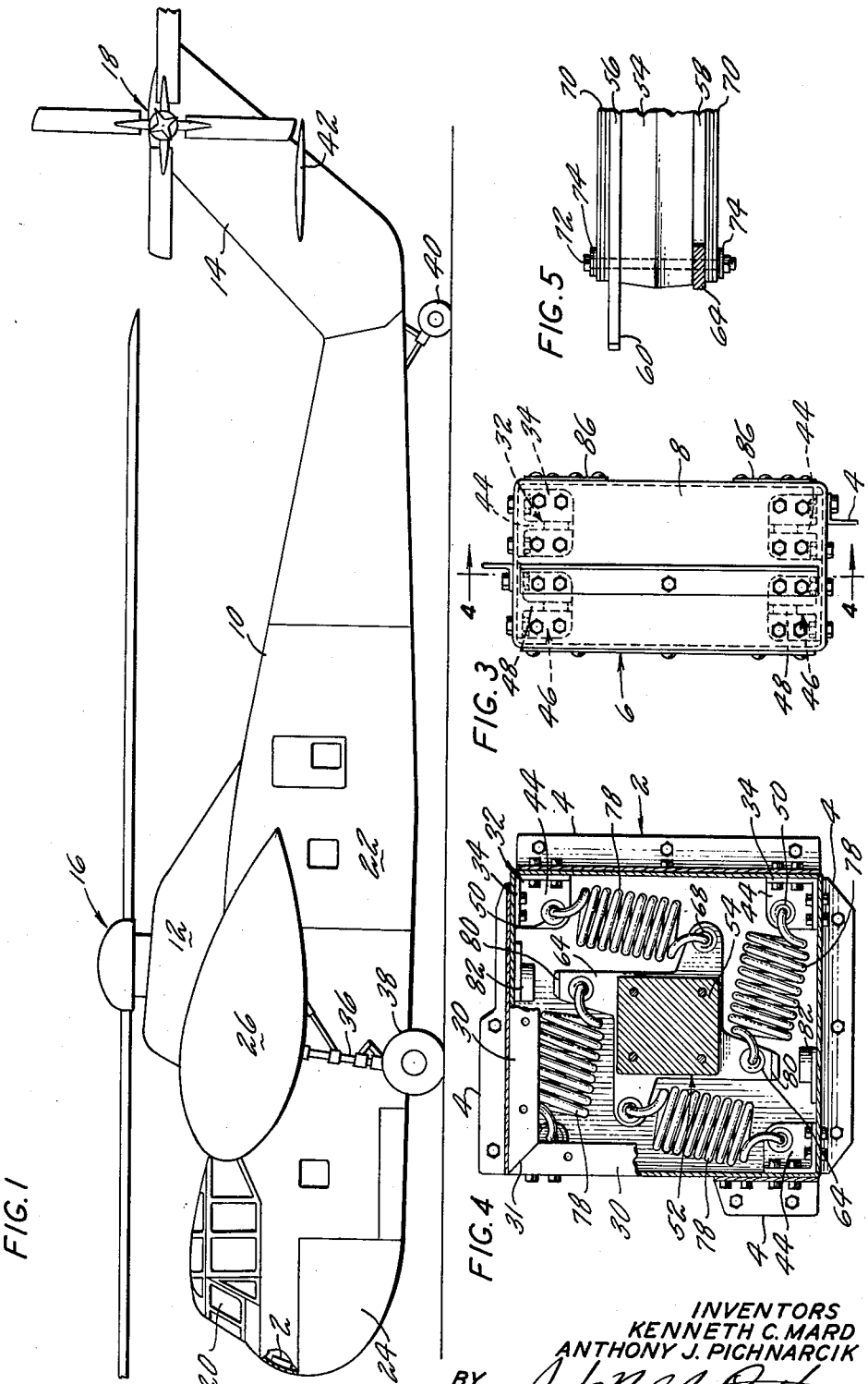

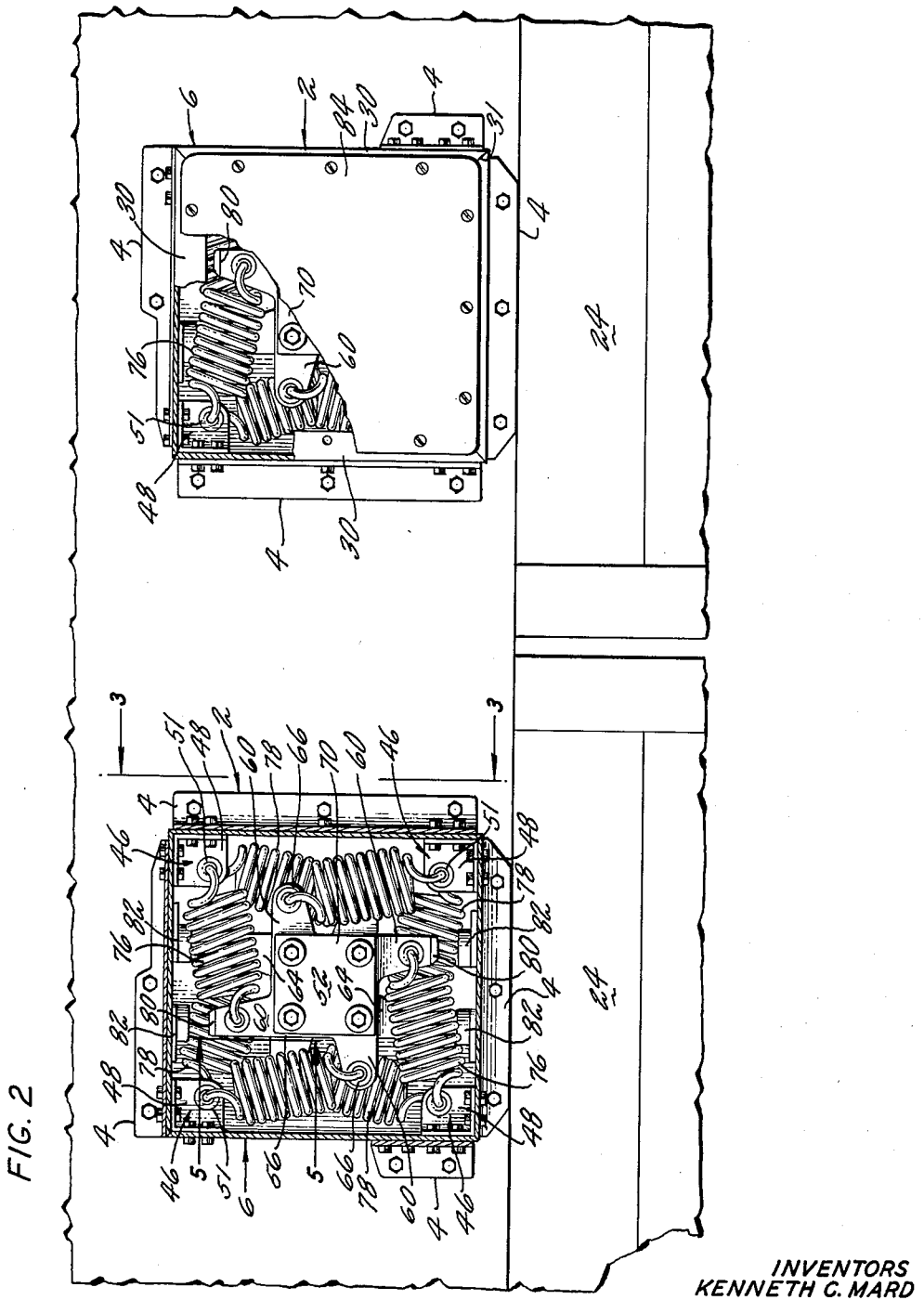

Filed Sept. 14, 1959 3 Sheets-Sheet 3

INVENTORS
KENNETH C. MARD
ANTHONY J. PICHNARCIK
BY Jack N. McCarthy
AGENT

United States Patent Office 3,005,520
Patented Oct. 24, 1961

3,005,520
VIBRATION ABSORBER
Kenneth C. Mard, Stratford, and Anthony J. Pichnarcik, Milford, Conn., assignors to United Aircraft Corporation, East Hartford, Conn., a corporation of Delaware
Filed Sept. 14, 1959, Ser. No. 839,841
10 Claims. (Cl. 188—1)

This invention relates to vibration absorbing means.

An object of this invention is to provide a vibration absorber which will dampen or cancel vibrations in a mass.

Another object of this invention is to provide a vibration absorber which will attenuate the vibration level in a body which is excited by a periodic force.

A further object of this invention is to provide a vibration absorber which will cancel vibrations in two directions.

Another objection of this invention is to provide a vibration absorber for aircraft which will have a satisfactory life.

A further object of this invention is to provide a vibration absorber which will be compact and light in weight.

Another object of this invention is to provide a vibration absorber which will absorb vibrations in an aircraft which are induced by a rotor assembly.

A further object of this invention is to provide a vibration absorber having a mass suspended by two spring suspension systems in different planes.

Another object of this invention is to provide a vibration absorber having a mass which can be varied.

A further object of this invention is to provide a vibration absorber with limit stops in one direction of motion.

These and other objects and advantages will be apparent from the specification and claims, and from the accompanying drawings which illustrate an embodiment of the invention.

In the drawings:

FIG. 1 is a side view of a helicopter with a section cut away showing the location of the vibration absorber;

FIG. 2 is a fragmentary view taken from inside the helicopter showing two vibration absorbers mounted above the clamshell doors in the nose of the helicopter;

FIG. 3 is an end view of the vibration absorber shown on the left of FIG. 2 taken along the line 3—3;

FIG. 4 is a view taken along the line 4—4 of FIG. 3 leaving a portion of the cover flange;

FIG. 5 is a view taken along the line 5—5 of FIG. 2;

Figure 6:
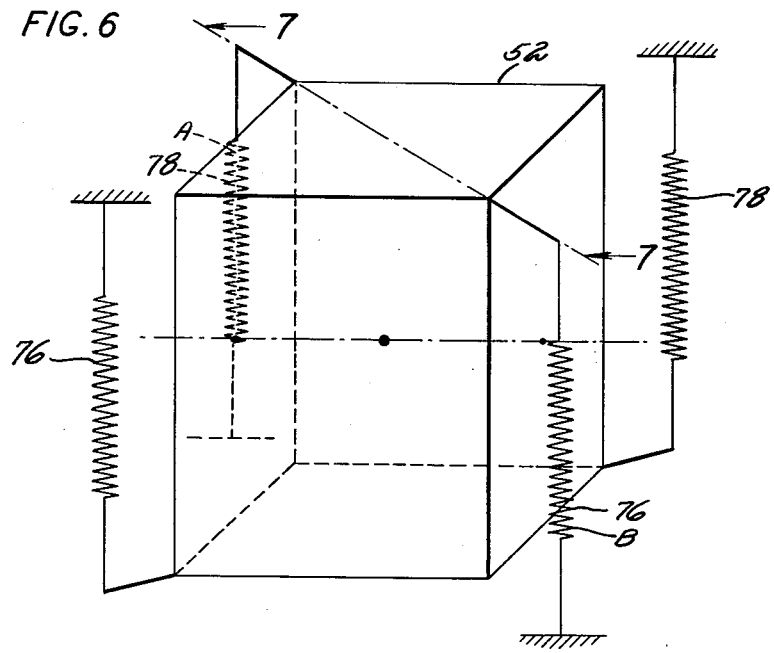
Figure 7:
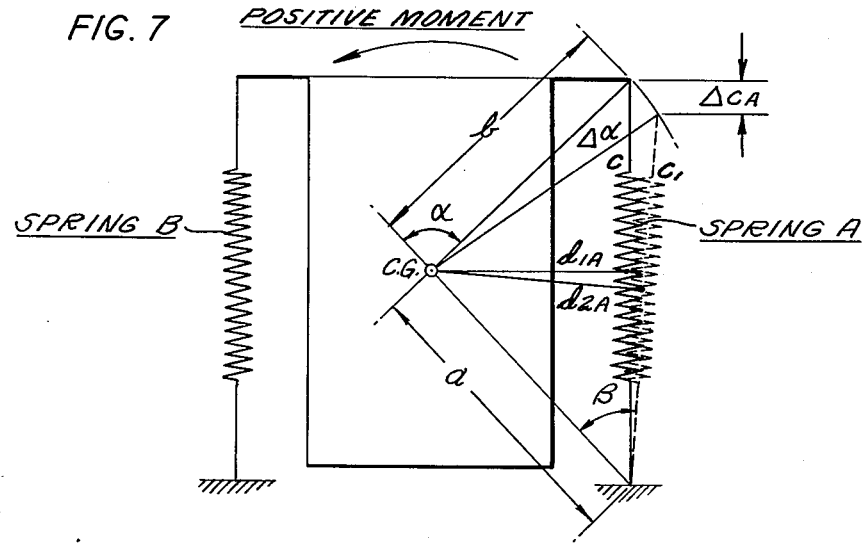

FIG. 6 is a schematic view of the mass 52 with vertical springs 76 and 78 located on two opposite sides; and FIG. 7 is a view showing a diagonal cross section through the mass of FIG. 6 with springs A and B at opposite corners.

Referring to FIG. 1, the helicopter comprises essentially an elongated fuselage 10 having a main rotor pylon 12 and a tail rotor pylon 14 on which are mounted a main rotor generally indicated at 16 and a tail rotor generally indicated at 18. The fuselage has a pilot compartment 20 ahead of the main rotor pylon 12, which is located in the upper part of the nose section of the fuselage. The space beneath the pilot compartment extends well aft beneath the main rotor pylon and comprises the main cargo or passenger compartment 22 of the ship. Access to the cargo compartment is gained through a pair of clamshell doors 24 in the nose of the fuselage.

The engines 26 of which two are provided, are mounted in engine nacelles which are carried at the ends of short wings. The ship is supported on the ground by a tricycle landing gear including main oleo struts 36 and wheels 38 which depend from the nacelles and by a tail wheel 40 depending from the fuselage just forward of the tail rotor cone 14. Stabilizer surfaces 42 extend outwardly from the tail pylon 14.

The main rotor is shown as having blades of the type which are pivotally connected to the rotor head or hub and is mounted on an upright shaft which extends through the pylon 12. The usual pilot's controls, collective pitch stick and a cyclic pitch stick, are connected to the rotor blades through control linkage and the usual swashplate mechanism for controlling the pitch of the blades. A helicopter of the type herein shown is fully shown and described in U.S. Patent No. 2,755,038 to Michael E. Gluhareff for a Helicopter-Airplane With Engines Mounted on Fixed Wings.

FIG. 1 shows the longitudinal location of vibration absorbers 2 in the nose of the ship at the upper part of compartment 22 above the clamshell doors 24. FIG. 2 shows the two vibration absorbers, one located on each side of the center line of the ship. While these vibration absorbers are mounted in position on the helicopter by a plurality of flanges which are located around the absorber, any other satisfactory means can be used. While a particular aircraft has been shown and a specific number of absorbers has been used, it is to be understood that subject device can be affixed to other aircraft having vibrations or other vibrating bodies and one vibration absorber or a plurality may be used as the situation demands.

A vibration absorber 2 comprises a box assembly 6 which is formed by four side plate members 8. Each plate member 8 has an inwardly turned flange 30 at one end and an inwardly turned flange 30 at its other end. These flanges are shaped at each end to meet forming a corner such as at 31. These side plate members are connected one to another at one end of where their edges meet, by flanged brackets 32. Each of these flanged brackets 32 includes a right angle bracket 34 and a flange 44 extending inwardly between the sides of the brackets at the center thereof. Four of these flanged brackets fix the side plate members in position at this end. The side plate members are connected one to another at the other end where their edges meet, by flange brackets 46. These flange brackets 46 are identical to brackets 32 and have a flange 48 extending inwardly between the sides of the brackets at the center thereof. Four of these brackets are used as at the other end of the box assembly. These brackets can be bolted to the side plate members or held in place in some other satisfactory way.

The flanges 44 of the brackets 32 are all situated in one plane and the flanges 48 of the brackets 46 are situated in a second plane parallel to said other plane. A ball bearing unit 50 is mounted in each flange 44 of the brackets 32 and a ball bearing unit 51 is mounted in each flange 48 of the brackets 46 for a purpose to be hereinafter described.

A mass 52 is suspended within the box assembly 6. This mass is cubic and formed as a composite structure. A block 54 is located at the center of the mass and has a width equal to the distance between the inner faces of the flanges 44 and 48. A mounting plate 56 and a mounting plate 58 are then placed one on each side of said block, the center portion of each of said plates having a shape substantially the same as that of the block 54. The plates 56 and 58 have a width equal to that of the flanges 48 and 44, respectively. Plate 56 is formed having an arm 60 projecting from each side thereof and plate 58 is formed having an arm 64 projecting from each side.

A ball bearing unit 66 is mounted in each arm 60 and a ball bearing unit 68 is mounted in each arm 64 for a purpose to be hereinafter described. A series of thin plate members 70 are located on the outside of each mounting plate 56 and 58. The number of these plates can be varied as it is found necessary to change the suspended mass 52. A bolt 72 is placed through plates 70, plates 56 and 58, the block 54 in a plurality of positions to maintain said mass 52 as a unit. Washers 74 are placed between the bolt ends and the plate 70 and can be varied to make minor adjustments in mass.

Mass 52 is mounted within box assembly 6 by having each of the arms 60 connected to a flange 48 of the box assembly by a spring 76. Each spring 76 is attached to its respective arm 60 and flange 48 to tend to rotate mass 52 in the same direction. Each of the arms 64 is connected to a flange 44 of the box assembly by a spring 78. Each spring 78 is attached to its respective arm 64 and flange 44 to tend to rotate mass 52 in the opposite direction from the springs 76. In its mounted position, it can be seen that plate 56 lies substantially in the plane formed by flanges 48 and that plate 58 lies substantially in the plane formed by flanges 44. Each spring 76 has one end located through the inner race of a ball bearing unit 51 on its cooperating bracket 46 and its other end through the inner race of a ball bearing unit 66 on its cooperating arm 60. Each spring 78 has one end located through the inner race of a ball bearing unit 50 on its cooperating bracket 32 and its other end through the inner race of a ball bearing unit 68 on its cooperating arm 64.

The vertical or lateral spring rate is affected by the springs in both planes. For instance, the net spring rate in the vertical direction is the sum of the spring rates of the vertical springs plus a rate contributed by the lateral springs which is determined by their preload and installed length—not their spring rate.

Bumper extensions 80 are placed on the arms 60 and 64 extending upwardly and downwardly from plates 56 and 58 as viewed in FIG. 2. Pads 82 are fixed to the sides of the box assembly 6 to provide mating bumpers for the bumpers 80 on the arms 60 and 64. A cover plate 84 is mounted on the end of the box assembly facing inwardly into the helicopter and angle members 86 are placed at each of the corners of the box assembly on the opposite side.

In FIG. 2, it can be seen that the center portion of plate 56 is generally square and has each of its arms 60 projecting substantially at right angles to the side to which it is connected. Each of these arms also extends from the end of the square located furthest from the flange 48 to which it is attached. From this figure, it can be seen that a torque is applied in a clockwise manner. It can be seen in FIG. 4, that the center portion of plate 58 is generally square and has each of its arm 64 projecting substantially at right angles to the side to which it is connected. Each of the arms also extends from the end of the square located furthest from the flange 44 to which it is attached. From this figure, it can be seen that torque is applied in a counterclockwise manner.

In the helicopter shown, two vibration absorbers were placed at a longitudinal location where the vertical vibration level was the highest. The installation of these absorbers produced a lower vibration level in this aircraft. These vibration absorbers were tuned so that each of them would have a natural period of vibration which would respond to the disturbing frequency which in this instance was 925 cycles per minute.

In the installation shown, the vertical and lateral spring rates were made different to compensate for differences in the spring rate of the supporting structure. It is possible to have a structure which will require equal spring rates in both coordinates to cancel the same frequency in these directions. It is possible to cancel different frequencies in the vertical direction with respect to the lateral simply by adjusting the relative spring rates. It is necessary to change the relative spring rates to obtain a change in tuning between the two directions because a change in mass will effect the tuning in both planes by approximately the same amount.

In assembling an absorber, a mass 52 is placed within the box assembly 6 and the springs of one set are put in place between their respective arms and flanges. The mass is then rotated expanding the springs and placing the other set of arms near their respective flanges so that the other set of springs can be placed in position. The rotative force is then removed allowing the mass to go into its static position.

The mass 52 in vibration absorber 2, as shown in FIG. 6, produces a stable device when the mass is displaced from its equilibrium position and the equation $$-d_{2A}(P-K\Delta c_A)+(P+K\Delta c_B)d_{2B}>0$$

is satisfied. This stable device is dependent on the preload, spring rate and geometry of the spring mass system.

The symbols used above and those on FIG. 7 are defined below:

$c$ = length of a spring initially installed
$c_1$ = length of a spring after small angular displacement of the mass about its C.G.
$b$ = arm length from C.G. to top of a spring
$a$ = arm length from C.G. to base of a spring
$d_1$ = moment arm from C.G. to axis of a spring initially installed.
$d_2$ = moment arm from C.G. to axis of a spring in displaced position
$\Delta\alpha$ = small angular displacement of mass
$\alpha$ = supplementary angle to the angle between $a$ and $b$
$\beta$ = angle between $c_1$ and $a$
$\Delta c$ = change in length of a spring resulting from the rotation $\Delta\alpha$
$K$ = spring rate
$P$ = preload (Subscript A is used for denoting spring A and subscript B is used for denoting spring B.)

In the system shown in FIG. 7, the moment arm of spring A is being increased and the preload of spring A is being decreased, and the moment arm of spring B is being decreased and the preload of spring B is being increased. Decreasing the preload and increasing the spring stiffness are ways in which the stability of this configuration can be improved.

For purposes of simplicity, the horizontal springs have been omitted from FIG. 7 but their effect will be to add to the stability of the system. The same analysis will apply, however, in considering stability about an axis perpendicular to the one considered, using the horizontal springs.

Some principles of vibration discussed herein are more fully treated in Mechanical Vibrations by Den Hartog, third edition, published by McGraw-Hill Book Company, Inc.

It is to be understood that the invention is not limited to the specific description above or to the specific figures, but may be used in other ways without departure from its spirit as defined by the following claims.

We claim:
1. A vibration absorber having a casing, a suspended mass, spring means connecting said mass to said casing, said spring means including a first set of springs mounted in a first plane, said spring means including a second set of springs mounted in a second plane parallel to the first plane.

2. A vibration absorber having a casing, a suspended mass, spring means connecting said mass to said casing, said spring means including a first set of springs mounted in one plane, said spring means including a second set of springs mounted in a second plane, said first set of springs placing a clockwise torque on said mass, said second set of springs placing a counterclockwise torque on said mass.

3. A vibration absorber having a casing, a suspended mass, said mass having first arms extending therefrom in a first plane, first spring means connecting said first arms to said casing, said first spring means comprising a plurality of springs located on said first plane tending to rotate said mass in a clockwise direction, said mass having second arms extending therefrom in a second plane, and second spring means connecting said second arms to said casing, said second spring means comprising a plurality of springs located on said second plane tending to rotate said mass in a counter-clockwise direction.

4. A vibration absorber having a casing, a suspended mass, said mass having first arms extending therefrom in a first plane, first spring means connecting said first arms to said casing, said mass having second arms extending therefrom in a second plane parallel to the first plane, and second spring means connecting said second arms to said casing.

5. A vibration absorber having a casing, a suspended mass, said mass having first arms extending therefrom in a first plane, first spring means connecting said first arms to said casing, said mass having second arms extending therefrom in a second plane, and second spring means connecting said second arms to said casing, said first spring means placing a clockwise torque on said mass, said second spring means placing a counter-clockwise torque on said mass.

6. A vibration absorber having a casing, a suspended mass, said mass including a block having two parallel sides, a rectangular plate affixed to each parallel side of said block, each plate having an arm extending from each side thereof, first spring means connecting the arms of one of said plates to said casing, and second spring means connecting the arms of the other of said plates to said casing.

7. A vibration absorber having a casing, a suspended mass, said mass including a block with two parallel sides, a rectangular plate affixed to each parallel side of said block, each plate having an arm extending from each side thereof, first spring means connecting said arms on one plate to said casing, and second spring means connecting said arm on the other plate to said casing, said first spring means comprising a first spring connected between each cooperating arm and said casing, each first spring extending from its arm at an angle, said second spring means comprising a second spring connected between each cooperating arm and said casing, each second spring extending from its arm at an angle.

8. A vibration absorber having a casing, a suspended mass, said mass including a block having two parallel sides, a rectangular plate affixed to each parallel side of said block, each plate having an arm extending from each side thereof, first spring means connecting said arms on one plate to said casing, and second spring means connecting said arm on the other plate to said casing, said first spring means comprising a first spring connected between each cooperating arm and said casing, each first spring extending from its arm at an angle, said second spring means comprising a second spring connected between each cooperating arm and said casing, each second spring extending from its arm at an angle, said first spring means placing a clockwise torque on said mass, said second spring means placing a counter-clockwise torque on said mass.

9. A vibration absorber having a casing, a suspended mass, said mass including a block having two parallel sides, a rectangular plate affixed to each parallel side of said block, each plate having an arm extending from each side thereof, first spring means connecting said arms on one plate to said casing, and second spring means connecting said arm on the other plate to said casing, said first spring means comprising a first spring connected between each cooperating arm and said casing, each first spring extending from its arm at an angle of nearby 90°, each arm of said one plate being connected to its side at a point located away from the point on said casing to which its cooperating spring is attached, said second spring means comprising a second spring connected between each cooperating arm and said casing, each second spring extending from its arm at an angle of nearly 90°, each arm of said other plate being connected to its side at a point located away from the point on said casing to which its cooperating spring is attached.

10. A vibration absorber having a casing formed as a four-sided box, a suspended mass, said mass including a block having two parallel sides, a rectangular plate affixed to each parallel side of said block, each plate having an arm extending from each side thereof, first spring means connecting said arms on one plate to said casing, and second spring means connecting said arm on the other plate to said casing, said first spring means comprising a first spring connected between each cooperating arm and a cooperating corner of said casing, each first spring extending from its arm at an angle, said second spring means comprising a second spring connected between each cooperating arm and a cooperating corner of said casing, each second spring extending from its arm at an angle.

References Cited in the file of this patent

UNITED STATES PATENTS

| | | |
|---|---|---|
| 989,958 | Frahm | Apr. 18, 1911 |
| 2,115,819 | Lewis | May 3, 1938 |
| 2,736,393 | O'Connor | Feb. 28, 1956 |
| 2,838,137 | Wallerstein | June 10, 1958 |

FOREIGN PATENTS

| | | |
|---|---|---|
| 791,342 | Great Britain | Feb. 26, 1958 |